Jan. 19, 1971 H. SCHARFEN 3,555,933
ADJUSTABLE HOLDER FOR TOOLS AND WORKPIECES
Filed Dec. 30, 1968 3 Sheets-Sheet 2

INVENTOR.
Hans Scharfen
BY

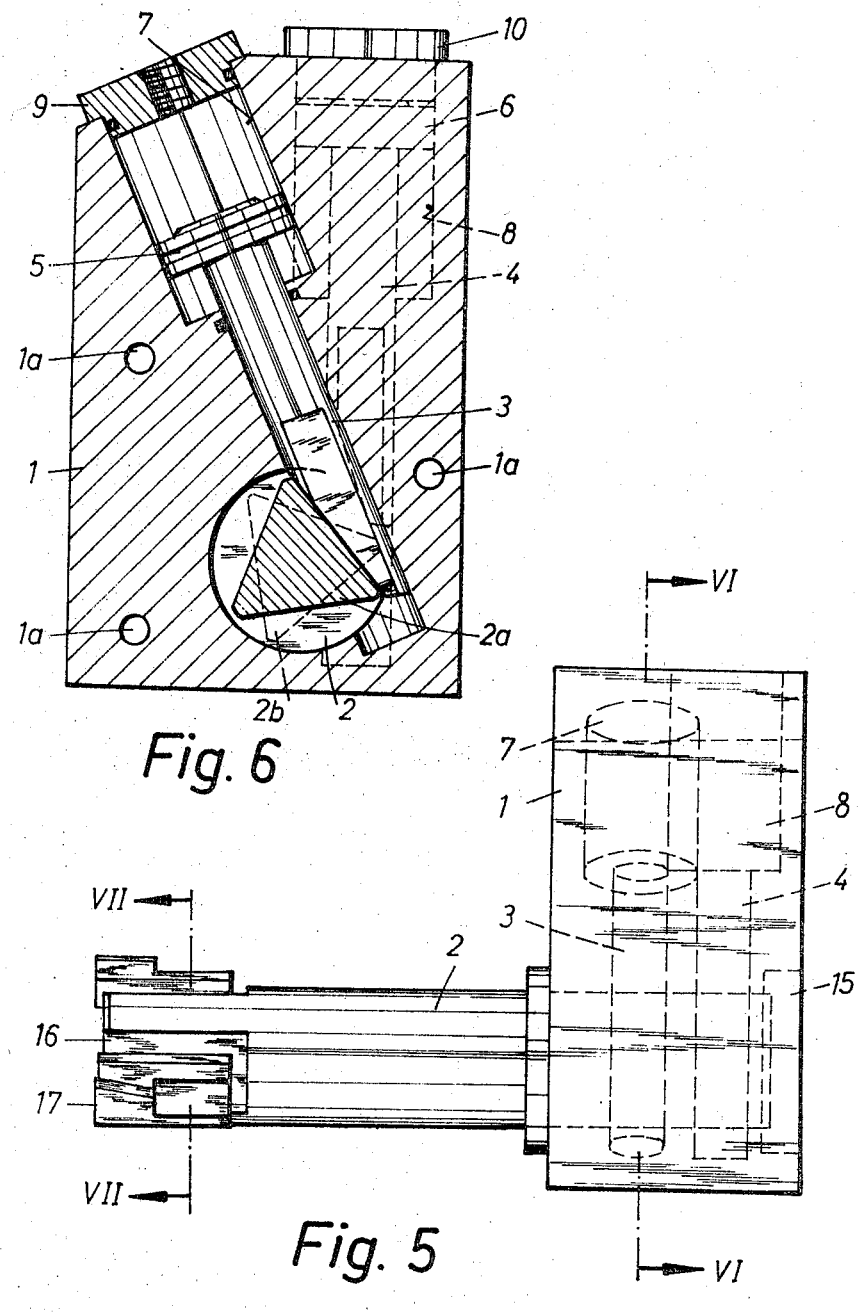

United States Patent Office 3,555,933
Patented Jan. 19, 1971

3,555,933
ADJUSTABLE HOLDER FOR TOOLS
AND WORKPIECES
Hans Scharfen, Buderich, Germany, assignor to Paul Forkardt Kommanditgesellschaft, Dusseldorf, Germany
Filed Dec. 30, 1968, Ser. No. 787,931
Claims priority, application Germany, Dec. 29, 1967, 1,602,776
Int. Cl. B23q 17/18
U.S. Cl. 74—816                                6 Claims

ABSTRACT OF THE DISCLOSURE

An indexing head for tools, workpieces, or abutments primarily for use on machine tools and including a main body having a bore in which a bearer spindle is rotatably mounted and capable of being locked in various specific angular positions. Two push rods, one behind the other and in two planes at right angles to the longitudinal center line of the spindle, are movable under fluid pressure in opposite directions. The push rods have end faces at an acute angle to their longitudinal center lines and each acting on the corners and side faces of polygonal sections of said bearer spindle. Side faces of the polygonal spindle sections are offset from each other by one-half of the indexing angle.

---

The invention relates to an adjustable holder or indexing head for tools, workpieces or abutments, intended primarily for use on machine tools.

Indexing heads have become known according to which a supporting shaft or spindle is rotatably journaled in a bore in the main body and is adapted to be locked in any of a plurality of specific angular positions. These heretofore known devices are, however, complicated in design, especially as to the indexing mechanism. Moreover, they are difficult to attach to a machine or the like and are unduly bulky while the indexing mechanism is not always sufficiently reliable or accurate.

It is, therefore, an object of this invention to provide an indexing head for tools, workpieces, and abutments which will overcome the above mentioned drawbacks.

It is another object of this invention to provide an indexing head of the above mentioned character, which can be used not only for rotating workpieces into various positions for machining, but also for bringing tools alternately into their operative positions.

It is still another object of this invention to provide an indexing head as set forth in the preceding paragraphs, in which the indexing operation will be accurate yet brought about by quite simple means, so that simplicity of design and a high degree of reliability are combined with compactness and ease of attachment.

A still further object of the invention consists in the provision of an indexing head which will be able to move into working position a plurality of abutments of different lengths e.g. for a tool carriage.

These and other objects and advantages of the invention will appear more clearly from the following specification in connection with the accompanying drawings, in which.

FIG. 5 diagrammatically illustrates a side elevation of a modified indexing head according to the invention.

FIG. 6 is a cross section along the line VI—VI in FIG. 5.

Figure 1:
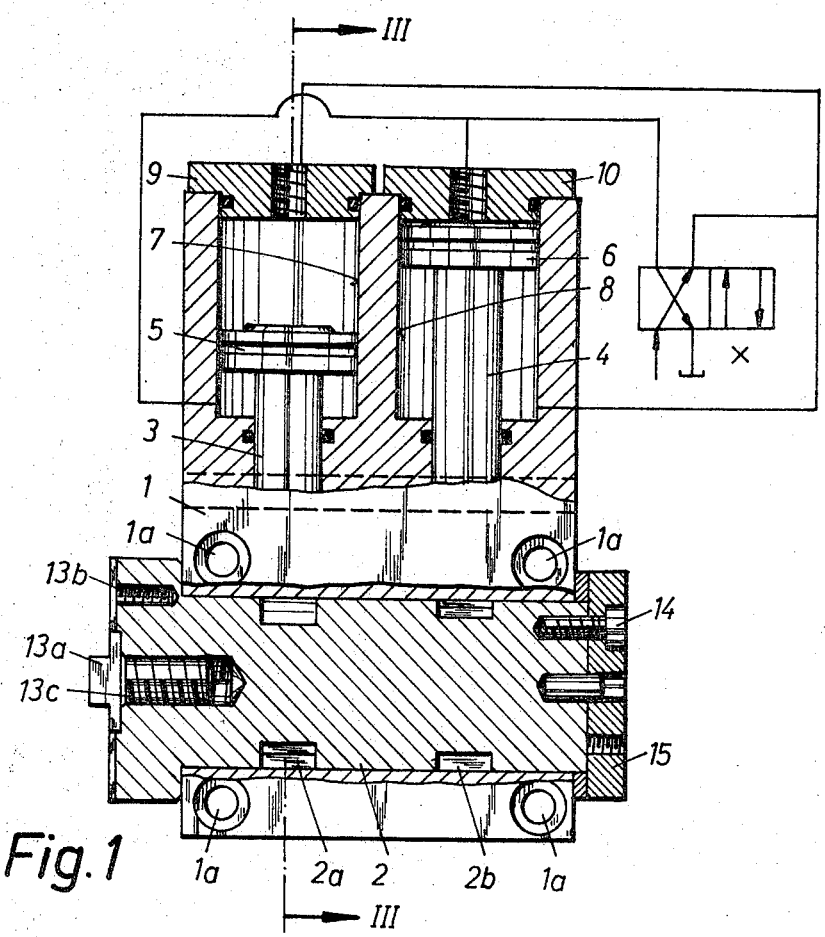
FIG. 1 is a longitudinal section through an indexing head according to the invention, said section being taken along the line I—I of FIG. 3.
Figure 4:
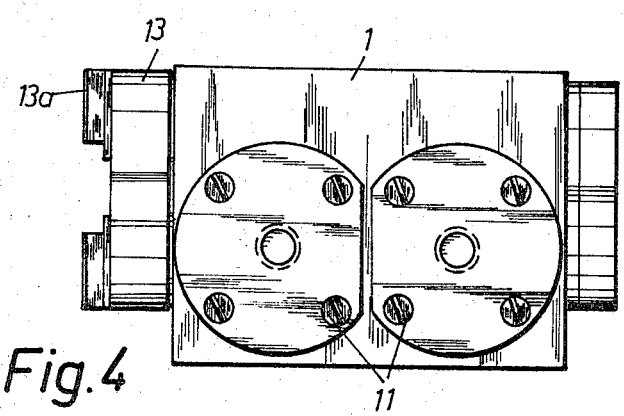
FIG. 4 is a top view of FIG. 1.
Figure 2:
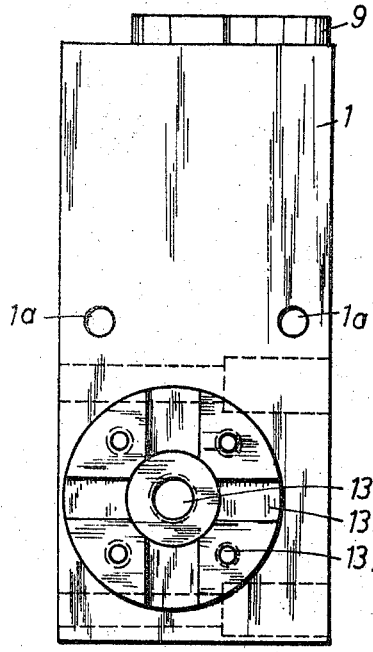
FIG. 2 is an end view of FIG. 1 as seen from the left side of FIG. 1.
Figure 3:
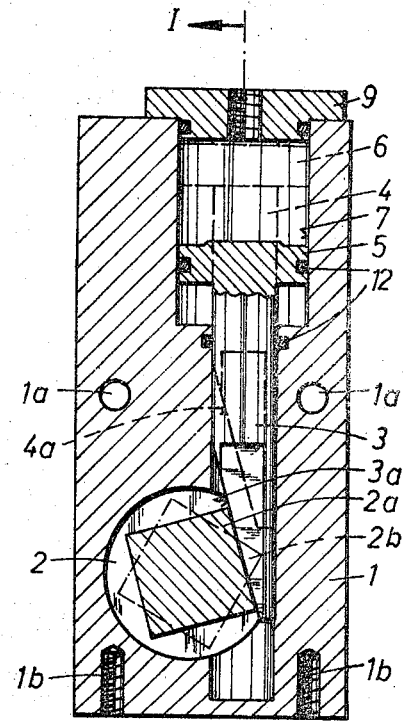
FIG. 3 is a cross section along the line III—III in FIG. 1.
Figure 7:
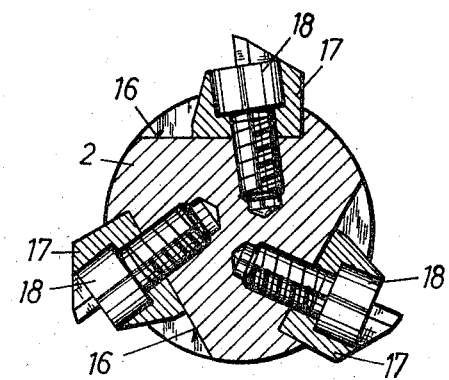

FIG. 7 is a section through a tool carrying spindle, said section being taken along the line VII—VII of FIG. 5.

The indexing head according to the invention is characterized primarily in that the main body has arranged therein two pressure medium operable push rods adapted to move counter currently with regard to each other, the end surfaces of said push rods forming an acute angle with regard to their longitudinal central axes and respectively cooperating with the corners and surfaces of a portion of said supporting spindle which spindle portions has a polygonal contour.

According to further features of the invention it is proposed that the two thrust pins or push rods be positioned, in successive planes at right angles to the longitudinal center line of the bearer or supporting spindle, (a) parallel or (b) at an acute angle with regard to each other and that the side faces of the respective polygonal sections of the bearer spindle be offset from one another, in the case of (a), by one-half of the indexing angle or, in the case of (b), by one-half of the indexing angle as well as by the angle between the push rods. By setting the two push rods at an acute angle to each, it is possible to reduce the length of the main body.

To enable the indexing head to be readily and securely attached to a machine or the like, especially to a machine tool, it is also proposed, according to the invention, that the main body be made substantially in the form of a rectangular block with plain contact faces and provided with a number of plain and screwthreaded holes running in various directions. This enables the indexing head here proposed to be simply and securely attached as a unit, in a variety of positions, to a machine or bed. One end or both ends of the bearing spindle may be carried through to project from the main body and provided with means of attachment for one or more of the workpieces, tools or abutments which it is desired to bring successively into the working position. It is also possible to form one end of the spindle into a flange.

Two practical examples of a tool or workpiece indexing head embodying the principle of the invention are illustrated in the drawings, and will now be described in greater detail.

In both the examples shown, the indexing head has a main body, 1, which is substantially a rectangular block with plain external faces containing a number of plain holes 1a and threaded holes 1b, with the aid of which the indexing head can be simply and securely attached as a unit in various positions. Rotatably journaled in this main body 1 is a carrier spindle 2, which by the two push rods 3 and 4 can be turned to and locked in specific angular positions.

In the first example, shown in FIGS. 1 to 4, the two push rods 3 and 4 are positioned one behind the other along the bearer or carrier spindle 2, parallel to each other, in two planes at right angles to the longitudinal center line of said spindle. The push rods are made in one piece with the pistons 5 and 6 respectively, which move axially within their respective cylinder bores 7 and 8 in the main body 1.

The end faces 3a and 4a (see (FIG. 3) of the push rods 3 and 4 lie at an acute angle to the longitudinal center lines of the pins, as can be seen from the drawings. These end faces 3a and 4a act on the corners and side faces of the respective sections 2a and 2b of the bearer spindle 2, which at those sections is polygonal. In the first example, the spindle sections 2a and 2b are square, as can be seen most clearly from FIG. 3.

These two square sections 2a and 2b, formed on the bearer spindle 2, are offset by 45° from each other, so that the bearer spindle 2 is turned through an angle of 45° every time a push rod 3 or 4 is operated. It is naturally possible for the spindle sections 2a and 2b to be given polygonal configurations having a different number of corners and side faces, so as to provide different indexing angles.

The push rods 3 and 4 are worked by the pistons 5 and 6 under the action of a pressure fluid, preferably oil, which is fed, through the feed pipes indicated in the drawing, to the cylinder bore 7 or 8, above or below the appropriate piston 5 or 6. The cylinder bores 7 and 8 are closed by covers 9 and 10 secured by the screws 11 to the main body 1. Between the covers 9 and 10 and the main body 1, between the pistons 5 and 6 and the cylinder bores 7 and 8 and between the push rods 3 and 4 and the main body 1 are packings, 12, to prevent leakage of the pressure fluid. A four-way valve is used for distributing the pressure fluid in such a way that the two push rods move simultaneously in opposite directions.

In the first example, shown in FIGS. 1 to 4, both ends of the bearer spindle 2 are carried through to the outside of the main body 1. One end carries a flange, 13, equipped with fixing members 13a and threaded holes 13b, as well as a central hole, 13c. Fixed to the other end of the spindle 2 by screws 14 is a plate 15 provided with means of connection whereby the position of the spindle can be indicated electrically for example.

In the second example, shown in FIGS. 5 to 7, only one end of the bearer spindle 2 is carried through to the outside of the main body 1. This projecting part is substantially cylindrical and contains recesses 16 in the end, spaced apart and offset from one another by 120°, each of which can hold a turning tool 17 secured in place by a screw 18.

To enable the bearer spindle to be rotated through 60° at a time, the spindle sections 2a and 2b are made triangular, as can be seen from FIG. 6.

Unlike the first example, the two push rods 3 and 4 in the second example are not parallel, but are inclined at an acute angle to each other. Consequently, the large cylinder bores 7 and 8 come to lie far enough apart to enable the two spindle sections 2a and 2b to be brought closer together, thereby reducing the overall length of the main body 1. In this second example, only one end of the bearer spindle 2 is carried through to the outside of the main body 1, the plate 15 being recessed into the latter. In other respects, the second example is the same as the first one.

By providing the bearer spindle 2 with polygonal sections at 2a and 2b and by shaping obliquely one end of each of the push rods 3 and 4 moving in the main body 1, not only will accurate indexing of the spindle 2 be ensured when a push rod 3 or 4 is operated (the other rod 4 or 3 always moving the opposite way at the same time), but also the spindle 2 will be locked in its new position, because the end face 3a or 4a of the rod 3 or 4 concerned bears against the appropriate side face of the spindle section 2a or 2b and prevents any undesirable rotation of the spindle 2. By variation in the design of whichever ends of the bearer spindle 2 project from the main body 1, both tools and workpieces can be fixed to them. It is thus possible, for example, to equip the indexing spindle 2 with large-diameter tool turrets and indexing or dividing tables.

It is, of course, to be understood that the present invention is, by no means, limited to the particular showing in the drawings, but also comprises modifications within the scope of the appended claims.

What I claim is:

1. An indexing head for tools, workpieces, abutments and the like, primarily for use on machine tools, comprising: a main body having a bore therein, a bearer spindle with freedom to rotate in the bore in the main body and capable of being locked in various specific angular positions, said spindle having offset polygonal sections forming corners and having side faces, two push rods movable in opposite directions under fluid pressure and having end faces at an acute angle to their longitudinal center lines and each acting on the corners and side faces of polygonal sections of said bearer spindle.

2. An indexing head according to claim 1, in which said two push rods are positioned one behind the other along said bearer spindle, parallel to each other, in two planes at right angles to the longitudinal center line of said spindle, said side faces of the polygonal spindle sections being offset in displacement from each other by one-half of the indexing angle.

3. An indexing head according to claim 1, in which said two push rods are positioned one behind the other along said bearer spindle, at an acute angle to each other, said side faces of the polygonal spindle sections displacement being offset from each other by one-half of the indexing angle as well as by the angle between said push rods.

4. An indexing head according to claim 1, in which said main body is substantially a rectangular block with plain contact faces and contains a number of plain holes and screwthreaded holes including the bore therein.

5. An indexing head according to claim 1, in which at least one end of said bearer spindle is carried through to the outside of said main body, and fixing members are equipped therewith.

6. An indexing head according to claim 5, in which said spindle end concerned is provided with a radial flange for mounting fixing members.

References Cited

UNITED STATES PATENTS

| 2,933,930 | 4/1960 | Huhn | 74—88X |
| 3,035,461 | 5/1962 | Benjamin et al. | 74—822 |

FOREIGN PATENTS

| 869,177 | 5/1961 | England | 74—825 |

FRED C. MATTERN, JR., Primary Examiner

F. D. SHOEMAKER, Assistant Examiner

U.S. Cl. X.R.

74—817, 819, 822